July 8, 1969     J. L. SCHNETTLER     3,454,055
POWERSAW WITH MITERING ATTACHMENT
Filed May 20, 1966
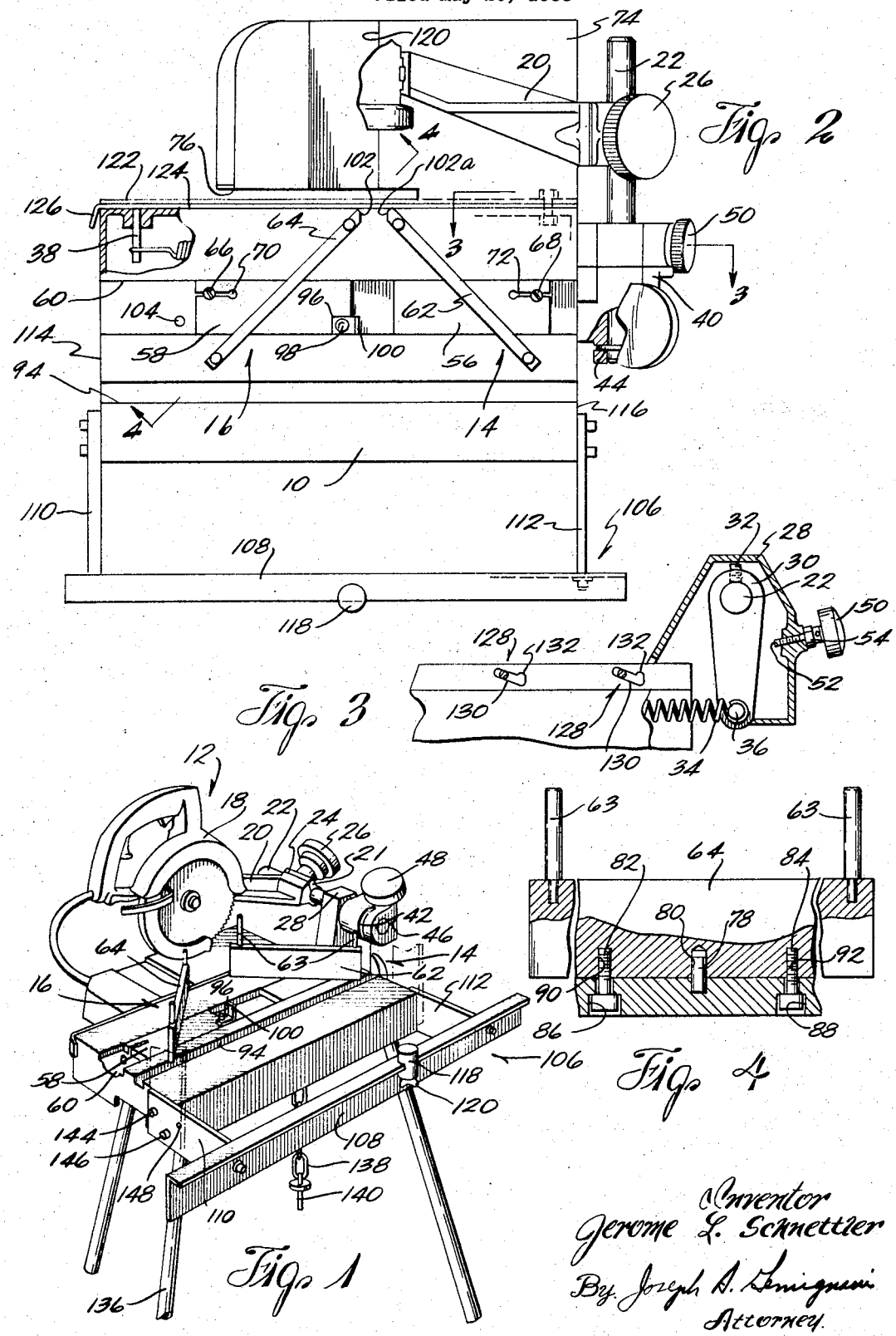

United States Patent Office 3,454,055
Patented July 8, 1969

3,454,055
POWERSAW WITH MITERING ATTACHMENT
Jerome L. Schnettler, Milwaukee, Wis., assignor to Milwaukee Electric Tool Corporation, Brookfield, Wis., a corporation of Wisconsin
Filed May 20, 1966, Ser. No. 551,717
Int. Cl. B27b 27/06
U.S. Cl. 143—6                                16 Claims

ABSTRACT OF THE DISCLOSURE

A powersaw assembly is supported for pivotal movement in a vertical cutting plane and relative to a horizontal workpiece support surface. The powersaw assembly can be locked in a desired horizontal and/or vertical position relative to the support surface. A pair of miter guides are supported for sliding movement parallel to the cutting plane and each is adjustable about a vertical axis to vary the angle thereof with respect to the cutting plane. A bracket is connected to one of the miter guides in alignment with the miter guide end nearest the cutting plane and on a line perpendicular to the cutting plane. A support extension projects from the support surface and is aligned therewith to support relatively long work pieces; a guide member is movable on the extension relative to the cutting plane. An additional support surface extension and a movable undercut attachment are provided at the cutting plane.

---

This invention relates to a powersaw with a mitering attachment and, more particularly, to a powersaw having a table which can function as a miter table as well as permitting virtually all other saw operations to be performed thereon.

A general object of this invention is to provide an improved and versatile powersaw table.

A further object of this invention is to provide a powersaw table on which miter cuts, rip cuts, square cuts, grooving, undercutting and trimming operations can be performed with facility and accuracy; and a still further object of this invention is to provide the powersaw table with a wide range of adjustment in such saw operations.

A still further object of this invention is to provide a compact, light weight and portable powersaw table which is capable of accommodating all of the aforementioned saw operations without detracting from either the facility or accuracy of those operations.

Other objects and advantages will be pointed out in, or be apparent from, the specification and claims, as will obvious modifications of the embodiment shown in the drawings, in which:

FIG. 1 is a perspective view of a powersaw table constructed in accordance with this invention;

FIG. 2 is a top plan view of the table;

FIG. 3 is a section view taken generally along line 3—3 of FIG. 2; and

FIG. 4 is a section view taken generally along line 4—4 of FIG. 2.

As illustrated in the drawing, the powersaw table includes a generally rectangular base 10 supporting a powersaw assembly 12. Right and left-hand miter guide assemblies 14 and 16 are supported on the upper side of base 10 as will be described more completely hereinafter.

A conventional powersaw 18 is pivotally supported for movement in a vertical cutting plane to perform a desired saw operation on a workpiece supported on the upper side of base 10. Structurally, powersaw 18 is supported on saw arm 20 and preferably has a conventional releasable connection to the saw arm to permit removal of the powersaw for use separate from the table. Base 21 of the saw arm engages support shaft 22. Base 21 is provided with a slot 24 and knob 26 is engaged in base 21 in a conventional manner to cooperate with the slot to selectively lock the saw arm to the support shaft for joint movement therewith or to release the saw arm for axial movement, and rotational movement if desired, on the shaft.

Support shaft 22 extends through an upright support housing 28 attached to base 10. Spring arm 30 (see FIG. 3) is disposed within the housing and is connected for joint movement with shaft 22 by set screw 32. An elongated spring 34 extends virtually the length of base 10 and has one end seated on spring arm pin 36 and its opposite end seated on pin 38 fixed to the base. Spring 34 biases the spring arm, and correspondingly the powersaw assembly, in a clockwise direction thereby functioning somewhat in the manner of a counterbalance arrangement. The spring normally positions the saw assembly in its up position and opposes downward, or counterclockwise, movement of the power saw assembly.

Shaft 22 also extends into a projection 40 on support housing 28. Projection 40 is provided with a first slot 42 which, with respect to shaft 22, extends circumferentially and radially and receives a retaining ring 44 which fits into a groove (not shown) in shaft 22 to cooperate in holding the shaft against axial movement. Projection 40 is also provided with a second slot 46 which, again with respect to shaft 22, extends radially and axially. Slot 46 and knob 48 cooperate in a conventional manner to selectively lock shaft 22 against rotation and thereby fix powersaw assembly 18 in a desired position in the vertical cutting plane or to release shaft 22 for rotation to permit free movement of the powersaw assembly in the cutting plane.

A third knob 50 is threaded into support housing 28 with its inner end 52 projecting toward spring arm 30. End 52 is in alignment with spring arm 30 and engages the spring arm as the powersaw assembly is pivoted in a counterclockwise direction to thereby establish a lower limit on the downward travel of the powersaw assembly. Manipulation of knob 50 provides for adjustment of the lower limit on downward travel of the powersaw assembly and lock nut 54 is provided to lock knob 50 and its end 52 in a selected position.

One of the primary functions of the powersaw table is to make miter cuts and for this purpose the right and left-hand miter guide assemblies are provided. Each miter guide assembly includes a base 56 and 58, each of which is arranged in an elongated guide track 60 provided in the upper side of base 10, and an upright guide 62 and 64. The track extends generally parallel to the cutting plane and with this arrangement the miter guide assemblies are slidable longitudinally in track 60 and each is provided with a locking screw arrangement to lock the guide assemblies in a desired position. More specifically, the locking screw arrangements include screws 66 and 68 engaged in slots 70 and 72 such that when the screws are turned in the slots the sides of bases 56 and 58 are wedged outwardly against the track walls to clamp the bases, and correspondingly the guide assemblies, in place. To make a miter cut in a workpiece, the workpiece is placed against the upright guide of either the right or left-hand miter guide assemblies, depending on the miter cut desired, and the saw arm and saw assembly are brought down to make the desired cut. A base extension 74 is connected to base 10 and, for a purpose which will be described hereinafter, its upper surface is below the level of the upper surface of base 10. For normal miter cut operation the cutting plane of the powersaw assembly separates the base and its extension 74 and a clearance slot 76 is provided between the extension and the base to afford clearance for the saw blade in making the miter cut. It will be appreciated that with the upright guides 62 and 64 being free-standing either side of the uprights can be used as miter guides. Posts 63 are connected on the upper end of each upright guide and provide an extension of the projection of the guides from the base to accommodate larger workpieces without requiring extension of the entire upright guide.

As illustrated in the drawing, the upright guides of the miter guide assemblies are set at 45° angles with the saw blade, or the cutting plane of the saw blade, so that 45° miter cuts can be made. The miter guide assemlies will be accurately adjusted at the factory but they are also constructed in a manner to provide for readjustment in the field should the preset miter angle, i.e., the angle of the upright guides with the cutting plane, be disturbed due to rough handling in shipment or in operation. More specifically and with reference to FIG. 4, an adjustable connection is provided between upright guide 64 and base 58 by means of pivot pin 78 connected between the base and upright member. Pin 78 is attached to base 58 and extends into an opening 80 in the upright guides. A pair of screws 82 and 84 pass through oversize clearance holes 86 and 88 in the base and are threaded into openings 90 and 92 in the underside of the upright guides. The clearance holes permit a limited amount of movement of the upright relative to the base and about pivot pin 78. The axis defined by pin 78 extends parallel to the cutting plane and movement of the upright guide about that axis varies the angular relationship to the cutting plane. Accordingly, the angle of the upright guide can be adjusted by loosening screws 82 and 84 and pivoting the upright guide, generally a protractor-type square is used to make this adjustment with the square being positioned between the saw blade and the upright guide. Only one miter assembly adjustment has been illustrated and described but it will be appreciated that the connection of the other upright guide to its base is identical and that the above description is equally applicable to it. Although a 45° miter guide angle has been discussed it will be appreciated that other angles can be used. The upright guides project above the level of the support surface provided by base 10 and track 60 will accommodate any miter guide assembly regardless of the angle of the upright guide with respect to the cutting plane. Furthermore, a protractor miter guide assembly can also be used with the table, slot 94 in the upper side of the base being provided to accommodate such a protractor. After the miter angle has been set either one or both of the miter guide assemblies can be moved to and locked in a desired position with its upright guide extending toward the cutting plane of the saw assembly so that a workpiece held against the upright guide will project into the cutting plane and the saw assembly will make the desired miter cut.

In addition to miter cuts, the powersaw table can also be used to make square cuts. For this purpose a square cut stop 96 is provided on miter guide assembly 16. Stop 96 is in the form of a generally L-shaped bracket and is attached to base 58 by screw 98, it will be appreciated that a similar square cut stop could be provided on base 56 or on both bases if desired. Vertical leg 100 of the bracket is generally aligned with a bevel face 102 provided on the end of upright guide 64 which faces toward the cutting plane. Stop screw 104 is threaded into an opening in the base of track 60 and is normally screwed below or at least flush with the base of the guide track but can be turned up to project into the groove provided by track 60 to function to hold miter guide assembly 16 against movement. The inner end of guide 64, or specifically bevel 102, and leg 100 are preferably aligned generally perpendicular to the cutting plane. With screw 104 properly positioned, a workpiece can be placed against bevel surface 102 and vertical leg 100 with one end projecting into the cutting plane of the powersaw. When so positioned, the saw can be pivoted downwardly and will make a square cut in the workpiece.

Bracket 96 provides a square cut guide for relatively short workpieces. To provide more stable support for longer workpieces frame 106 is attached to and extends from base 10. Structurally, extension frame 106 includes an angle member 108 attached to the table base by extension arms 110 and 112 which are in turn connected to opposite ends 114 and 116 of base 10. An adjustable stop block 118 is releasably clamped on angle 108 by wing bolt 120 and can be moved into alignment with bevel 102, or a similar bevel face 102a on upright guide 62, and cooperate with that bevel and base 10 in supporting a long workpiece for a square cut.

The power table is also capable of performing a ripping operation. Extension 74 provides the support for the workpiece during the ripping operation and the extension of base 10 above the bevel of extension 74 provides a surface against which a workpiece can be supported during a ripping operation. To this end a rip guide bar 122 is attached to and extends along edge 124 of base 10 and provides a guide face for the workpiece. To perform the ripping operation, knob 26 is released and the powersaw arm moved axially on shaft 22 the necessary distance from guide bar 122 depending on the width of the rip cut to be made. Knob 26 is then tightened to clamp the powersaw arm in position. A groove 120 is provided in extension 74 and is generally aligned with the saw blade to provide clearance for the saw blade in making the rip cuts. The powersaw assembly is lowered until the powersaw blade just clears the lower surface of groove 120 at which point knob 48 is tightened locking shaft 22 against rotation and the powersaw assembly in the desired position. With the powersaw assembly locked, the workpiece can be moved along rip guide 122 and through the saw blade to make the rip cut.

In addition to the rip cut it will be appreciated that the same adjustment features can also be used to provide a grooving operation. Through manipulation of knobs 26 and 48 the saw blade can be set so that it will not extend completely through a workpiece but will only extend to the depth of the groove desired. The grooving operation is an extension of the rip cut operation and once the power saw assembly is locked in the desired position the groove is made by moving a workpiece through the powersaw assembly in the same manner as when a rip cut is being made.

For trimming or undercutting a workpiece, undercut bar 126 is also provided. This bar is arranged between rip guide bar 122 and edge 124 of base 10. The undercut bar includes angular slots 128 each of which include an elongated portion 130 and a land 132. Screws 134, which fasten rip bar 122 to the base, pass through slots 128 to also hold the undercut bar in the table. By virtue of the slot 120 the undercut bar is free for longitudinal movement and to perform an undercut operation the undercut bar is withdrawn to the left as viewed in FIG. 2 and in so doing slots 128 cam the undercut bar upwardly. Lands 132 determine the outer limit of undercut bar movement and at that point screws 134 are engaged in lands 132 and lock the undercut bar in place and project above the plane of base 10. The undercut bar is locked in place in the sense that the lands prevent the undercut bar from returning to its lowered inner position solely as the result of the application of a downward force. A workpiece laid on the upper side of base 10 and over the withdrawn undercut bar is at an angle to the cutting plane of the powersaw to permit trimming or undercutting. After the operation is completed, the undercut bar can be returned to its normal, inoperative position by manually freeing screws 134 from lands 132 and pushing the undercut bar inwardly.

The powersaw table is supported on three detachable legs 136. These legs screw into suitable openings (not shown) provided in the underside of base 10 and can be removed and strapped to the underside table by chain assembly 138. The chain assembly includes a lock member 140 which fits into a cutout (not shown) also provided on the underside of the table. Cutouts 142 are provided in each of the ends 114 and 116 of the base to better accommodate the legs. Extension frame 106, in the position illustrated in the drawing, provides a handle by which the table can be carried from one job site to another, preferably with the legs removed and attached by the chain to the base. Furthermore, the connection of the extension to the base is adjustable so that, when not in operation, the extension can be folded upwardly from the position illustrated in the drawing to function as a support base on which the powersaw table, with the legs detached and stored, can be stored. In this position the extension is displaced approximately 90° from the position illustrated in FIGS. 1 and 2 (see partial dotted line showing in FIG. 1). The connection of extension arm 112 to end 116 is identical to that just described and for that reason it will not be specifically described. More particularly, a dowel-type connection is provided which consists of two threaded dowels 144 and 146 and three triangularly arranged openings 148 in extension bar 110. End 114 includes two threaded openings (not shown) for receiving the threaded dowels. When it is desired to pivot extension frame work upwardly inner dowel 144 is removed to release the extension to pivot on outer dowel 146 until outer opening 142 registers with the threaded opening in base 10 whereupon dowel 144 is inserted to clamp the extension in the upper position.

Although but one embodiment of the present invention has been illustrated and described, it will be apparent to those skilled in the art that various changes and modifications may be made therein without departing from the spirit of the invention or from the scope of the appended claims.

I claim:

1. A powersaw table apparatus comprising, in combination, means defining a workpiece support surface, a powersaw assembly including a powersaw and means supporting said powersaw for movement in a cutting plane extending generally normal to said support surface, at least one miter guide assembly including a base and a guide attached to said base, said guide extending from said support surface in a direction generally normal to said support surface and also having an extension which is at a desired angle to said cutting plane, means in said support surface defining guide means for said miter guide assembly which extends generally parallel to said cutting plane, said base of said miter guide assembly engaged in said guide means, means engageable between said miter guide assembly and said workpiece support surface for selectively releasing said miter guide assembly for movement of said base, and said guide with said base, in said guide means and holding said miter guide assembly in a desired position with said guide extending toward said cutting plane so that a workpiece can be held against said guide and project into said cutting plane and movement of said powersaw through said workpiece will make a desired miter cut therein determined by the angle of said guide to said cutting plane, and means connected between said guide and said base and operative to release said guide for movement relative to said base about an axis parallel to said cutting plane to adjust the angular position thereof relative to said plane and to clamp said guide to said base for movement with said base and against movement about said axis, whereby said guide is movable relative to said base about said axis to adjust said angular position and said guide, in a preselected adjusted angular position, is movable with said base as said base moves in said guide means.

2. The powersaw apparatus of claim 1 wherein said means connecting said guide to said base includes means engaged between said guide and base and defining said axis, and screw means spaced from said axis, said screw means threaded into one of said guide and base and passing through a clearance hole in the other of said guide and base, said clearance hole being such as to permit limited relative movement between said guide and base with said screw means loosened but in place.

3. The powersaw apparatus of claim 2 wherein said connecting means also includes additional screw means threaded into said one of said guide and base and passing through a second clearance hole in the other of said guide and base, said second clearance hole also being sufficient to permit limit relative movement between said guide and base with said fastening means loosened but in place.

4. The powersaw apparatus of claim 1 including a second miter guide assembly also including a second base engaged in said guide means and a second guide having an extension generally normal to said support surface and also having an extension toward and at an angle to said cutting plane, said second guide also being disposed at an angle to the guide of said other miter guide assembly, and means connecting said second guide to said second base for movement therewith and operative to release said second guide for movement relative to said base about a second axis parallel to said cutting plane to adjust the angular positon thereof relative to said plane and to clamp said second guide to said second base against movement about said second axis, whereby said second guide is movable relative to said second base about said second axis to adjust said angular postion and said second guide, in a preselected adjusted angular positon, is movable with said second base as said second base moves in said guide means.

5. A powersaw apparatus comprising, in combination, means defining a workpiece support surface, a powersaw assembly including a powersaw and means supporting said power saw for movement in a cutting plane extending generally normal to said support surface, at least one miter guide assembly including a base and a guide attached to said base, said guide extending from said support surface in a direction generally normal to said support surface and also having an extension which is at a desired angle to said cutting plane, said guide having opposite ends one end facing toward said cutting plane and the other end facing away from said cutting plane, means in said support surface defining guide means for said miter guide assembly which extends generally parallel to said cutting plane, said base of said miter guide assembly engaged in said guide means, means engageable between said miter guide assembly and said workpiece support surface to position said miter guide assembly in a desired position with said guide extending toward said cutting plane so that a workpiece can be held against said guide and project into said cutting plane and movement of said powersaw through said workpiece will make a desired miter cut therein determined by the angle of said guide to said cutting plane, and including bracket means connected to said base and having an extension projecting generally normal to said support surface, said bracket means extension generally aligned with said one end of said guide along a line generally perpendicular to said cutting plane.

6. The powersaw apparatus of claim 5 including means defining an extension connected to said means defining said support surface and projecting therefrom in a direction away from said cutting plane, said extension including a support surface generally aligned with said other support surface so that a workpiece can be supported on both of said support surfaces projecting into said cutting plane, and means slidably engaged on said extension support means for movement thereon relative to said cutting plane so that a workpiece can be held against said one guide end and said slidable means and project into said cutting plane.

7. The powersaw attachment of claim 6 including means connecting said extension to said means defining said support surface for movement about an axis parallel to said extension support surface between a first position wherein said extension support surface is parallel and generally aligned with said first-mentioned support surface and a second position angularly displaced approximately 90° from said first position and further operative to selectively connect said extension in said first and second positions.

8. A powersaw apparatus comprising, in combination, means defining a horizontal workpiece support surface, a powersaw assembly supported on a horizontally extending shaft for pivotal movement in a vertical cutting plane extending generally normal to said support surface, at least one miter guide assembly including a base and a guide attached to said base, said guide extending from said support in a direction generally normal to said support surface and also having an extension which is at a desired angle to said cutting plane, means in said support surface defining guide means for said miter guide assembly which extends generally parallel to said cutting plane, said base of said miter guide assembly engaged in said guide means, means engageable between said miter guide assembly and said workpiece support surface to position said miter guide assembly in a desired position with said guide extending toward said cutting plane so that a workpiece can be held against said guide and project into said cutting plane and movement of said powersaw through said workpiece will make a desired miter cut therein determined by the angle of said guide to said cutting plane, first means connected between said powersaw assembly and said shaft and operative selectively to release said powersaw assembly for axial movement on said shaft and lock said power saw assembly in a selected axial position on said shaft and for joint movement with said shaft, second means connected to said shaft and operative selectively to release said shaft for free movement of said power saw assembly in said cutting plane and clamp said shaft against rotation to lock said powersaw assembly in a selected vertical position in said cutting plane, means normally biasing said powersaw assembly toward and holding said powersaw assembly in a position spaced upwardly from said support surface, and third means engageable with said powersaw assembly to limit downward movement thereof in said cutting plane and adjustable to vary the downward limit of powersaw movement.

9. The powersaw apparatus of claim 8 including means extending parallel to said shaft, below the level of said support surface, and aligned with said powersaw assembly to provide clearance for said powersaw assembly in performing a ripping operation.

10. The powersaw attachment of claim 9 wherein said support surface is disposed to one side of said cutting plane and said clearance means is provided in an extension projecting from said support surface on the opposite side of said cutting plane and spaced below said support surface, and including a guide surface extending between said extension and said support surface parallel to said cutting plane.

11. The powersaw attachment of claim 10 including an undercut bar arranged at said guide surface adjacent said cutting plane, and cam means connecting said undercut bar to one of said base and extension and effective selectively to position said undercut bar projecting above the level of said support surface and to position said undercut bar at least flush with said support surface.

12. A powersaw attachment comprising, in combination, a base having a generally planar support surface, a powersaw assembly, means supporting said powersaw assembly for movement in a cutting plane generally normal to said planar support surface, a miter guide having an extension projecting toward and at an angle to said cutting plane, means defining a guide for said miter guide extending generally parallel to said cutting plane, and means connected to said miter guide and generally aligned with the end of said miter guide nearest said cutting plane along a line generally perpendicular to said cutting plane so that a workpiece can be held against said one miter guide end and said means and project into said cutting plane.

13. The powersaw apparatus of claim 12 including means defining an extension frame connected to said means defining said support surface and projecting therefrom in a direction away from said cutting plane, said extension frame including a support surface generally aligned with said other support surface so that a workpiece can be supported on both of said support surfaces projecting into said cutting plane, and means slidably engaged on said extension frame support surface for movement thereon relative to said cutting plane so that a workpiece can be held against said one guide end and said slidable means and project into said cutting plane.

14. The powersaw attachment of claim 12 wherein said means supporting said powersaw assembly supports said powersaw for adjustable movement parallel to said support surface, and including means defining a workpiece support surface generally coextensive with the range of adjustment of said power saw assembly parallel to said support surface and including means aligned with and providing clearance for said powersaw assembly in making a rip cut throughout said range of adjustment.

15. The powersaw apparatus of claim 13 wherein said extension frame support surface extends parallel to said cutting plane and said means on said extension frame moves parallel to said cutting plane.

16. A powersaw table apparatus comprising, in combination, a base having a generally planar support surface, a powersaw assembly, means supporting said powersaw assembly for movement in a cutting plane generally normal to said planar support surface, a miter guide having an extension projecting toward and at an angle to said cutting plane, means defining a guide for said miter guide extending generally parallel to said cutting plane, means defining an extension frame connected to said means defining said support surface and projecting therefrom in a direction away from said cutting plane, said extension frame including a support surface generally aligned with said other support surface so that a workpiece can be supported on both of said support surfaces projecting into said cutting plane, and means slidably engaged on said extension frame support surface for movement thereon relative to said cutting plane so that a workpiece can be held against said one guide end and said slidable means and project into said cutting plane.

References Cited
UNITED STATES PATENTS

| | | | |
|---|---|---|---|
| 3,105,528 | 10/1963 | Loughridge | 143—6.46 |
| 3,327,742 | 6/1967 | Turcotte | 143—6 |
| 3,344,819 | 10/1967 | Mitchell | 143—6 |
| 3,139,124 | 6/1964 | Hoff | 143—6.46 |

FRANCIS S. HUSAR, *Primary Examiner.*

U.S. Cl. X.R.

143—46, 132, 169, 174